Feb. 13, 1973  C. S. DEERING  3,716,783
SEQUENTIAL CHECK-OUT SYSTEM INCLUDING CODE COMPARISON
FOR CIRCUIT OPERATION EVALUATION
Filed Oct. 30, 1969  3 Sheets-Sheet 1

INVENTOR
CHARLES S. DEERING

Richards, Harris & Hubbard
ATTORNEY

INVENTOR
CHARLES S. DEERING

Richards, Harris & Hubbard
ATTORNEY

INVENTOR

CHARLES S. DEERING

Richards, Harris & Hubbard

ATTORNEY

United States Patent Office 3,716,783
Patented Feb. 13, 1973

3,716,783
SEQUENTIAL CHECK-OUT SYSTEM INCLUDING CODE COMPARISON FOR CIRCUIT OPERATION EVALUATION
Charles S. Deering, Richardson, Tex., assignor to E-Systems, Inc., Dallas, Tex.
Filed Oct. 30, 1969, Ser. No. 872,582
Int. Cl. G01r 15/12, 31/00
U.S. Cl. 324—73                    14 Claims

ABSTRACT OF THE DISCLOSURE

A "GO" or "NO GO" indication of circuit operation is produced by exercising the operation of the circuit through various modes. To evaluate the operation of a circuit, a programmer produces a series of input check signals in a sequence determined by control pulses. These check signals are connected to the inputs of the circuit under evaluation and exercise the circuit through the various operating modes. As the circuit is exercised, output signals are produced which connect to an encoder. The encoder produces an operations code in response to the circuit output signals. This operations code is compared with a standard code which has been derived in advance. If the operations code compares favorable with the standard code, a "GO" indication is produced; if the two codes do not match, a "NO GO" indication is produced. Either analog or digital circuits may be checked for operation.

---

Figure 1:
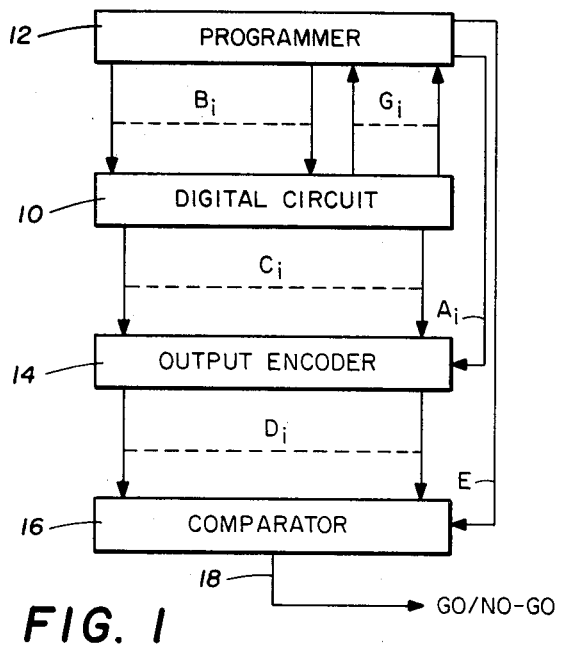

This invention relates to circuit operation evaluation, and more particularly to evaluation of a circuit by exercising it through various operating modes and encoding the output signals.

In conventional methods for automatic GO/NO GO testing of circuit operation, the outputs of the circuit are compared with standard outputs as the circuit is operated through a sequence of modes. If a comparison between any one of the circuit outputs and the standard output fails to produce a match during any step of the testing sequence, a NO GO indication results. Conventional methods thus require circuitry which generates the standard outputs during each step of the mode sequencing, in addition to a programmer for advancing the sequence and a comparator for making the code comparison. To generate the standard outputs requires essentially a duplication of the functions of the circuit under evaluation. Further, the comparator used in conventional methods is often a complicated arrangement of individual circuits for each of the various signals to be compared. Attendant with the complexity of presently available methods was the expense of the equipment required and unreliability in addition to unacceptably high power requirements.

An object of the present invention is to provide a system for circuit operation evaluation by a sequential check-out. Another object of this invention is to provide a system for circuit operation evaluation by the comparison of an operating code with a standard code. Still another object of this invention is to provide a simplified digital system for circuit evaluation. A further object of this invention is to provide a reliable low cost system for circuit evaluation. A still further object of this invention is to provide a method of evaluating the operation of a circuit. Yet another object of this invention is to provide a method of sequencing the operation of a circuit for evaluation thereof.

In accordance with the present invention, the sequential check-out of circuit operation evaluation is performed by a system including a programmer for generating a sequence of input check signals to exercise the circuit through any desired number of operating modes. This sequence of input check signals produces a given sequence of circuit outputs, depending on the circuit operation. Output signals from the circuit under evaluation are connected to an encoder which responds thereto and encodes the circuit operation into an operations code. The operations code is connected to a comparator for a comparison with a standard operations code. If the two compared codes are similar, a circuit acceptance indication is generated, that is, a "GO" signal. When the two compared codes differ, a circuit rejection indication is generated, that is a "NO GO" signal.

Further, in accordance with this invention, the sequential check-out of circuit operation evaluation is performed by a system that includes an encoder having an end-around shift register as a part thereof. The end-around shift register includes alternate stages of flip-flop circuits and reverse logic units. The reverse logic units respond to output signals from the circuit under evaluation to establish a given digital code at the output of each flip-flop circuit. Where large numbers of output signals are produced by the circuit under evaluation, these outputs may be multiplexed in groups such that each group of outputs is multiplexed to one of the reverse logic units.

A more complete understanding of the invention and its advantages will be apparent from the specification and claims and from the accompanying drawings illustrative of the invention.

Figure 3:
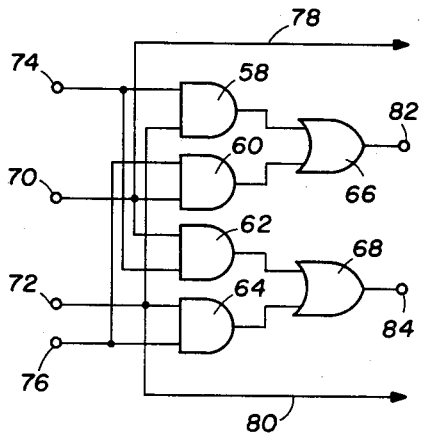
Figure 2:
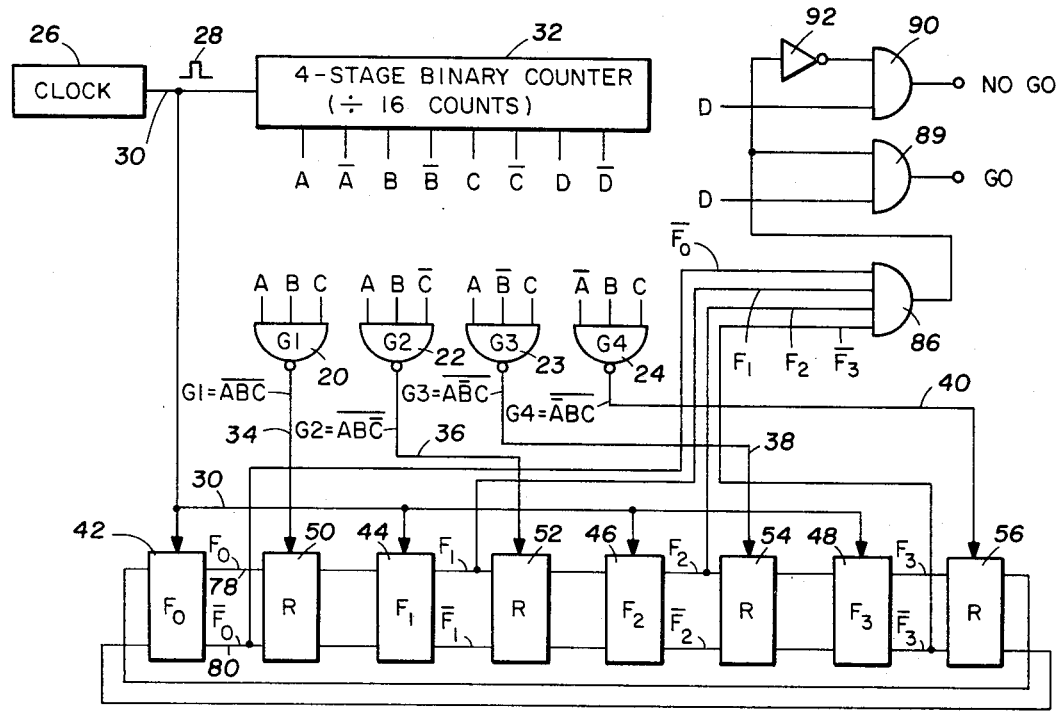
Figure 4:
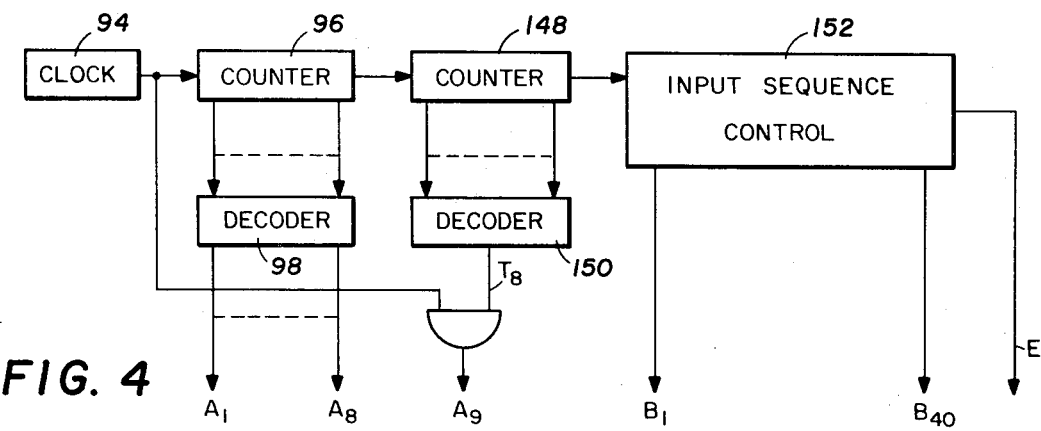
Figure 5:
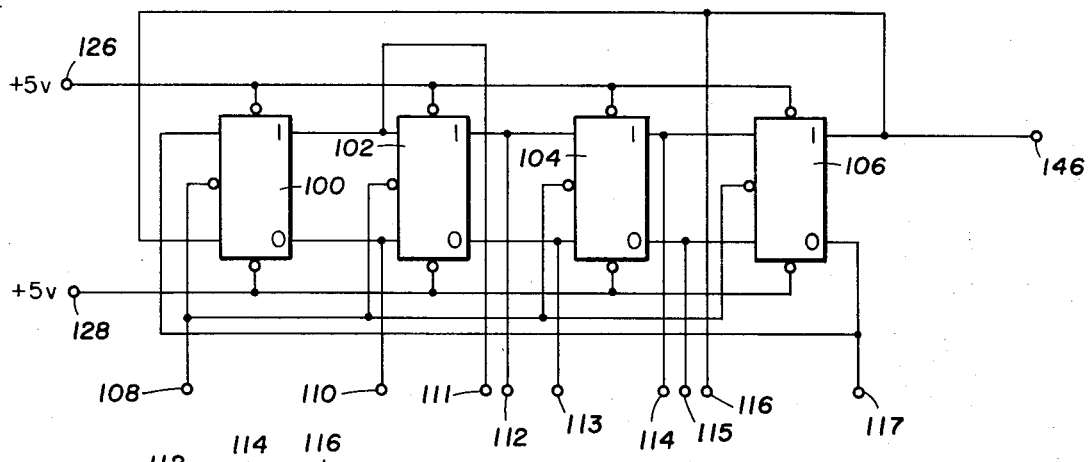
Figure 6:
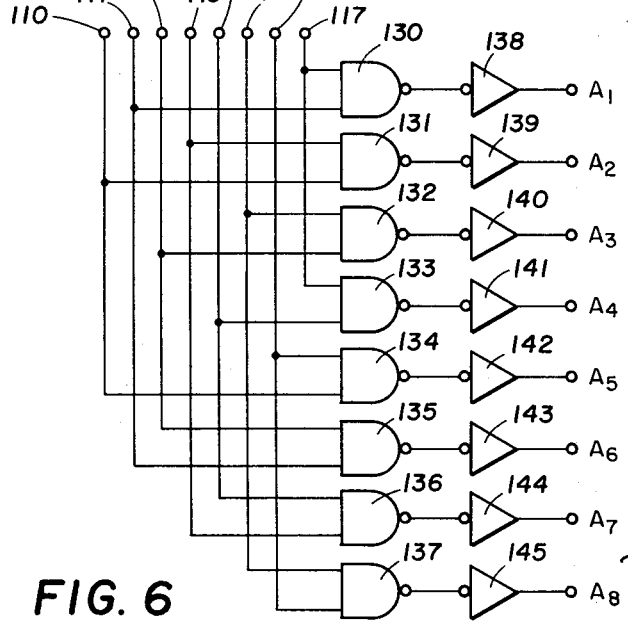
Figure 7:
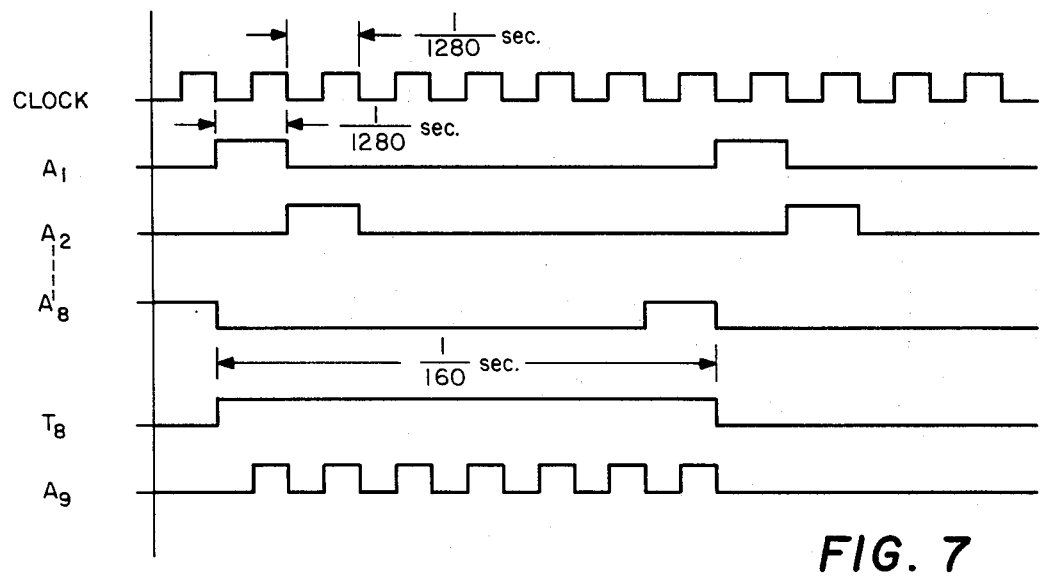
Figure 8:
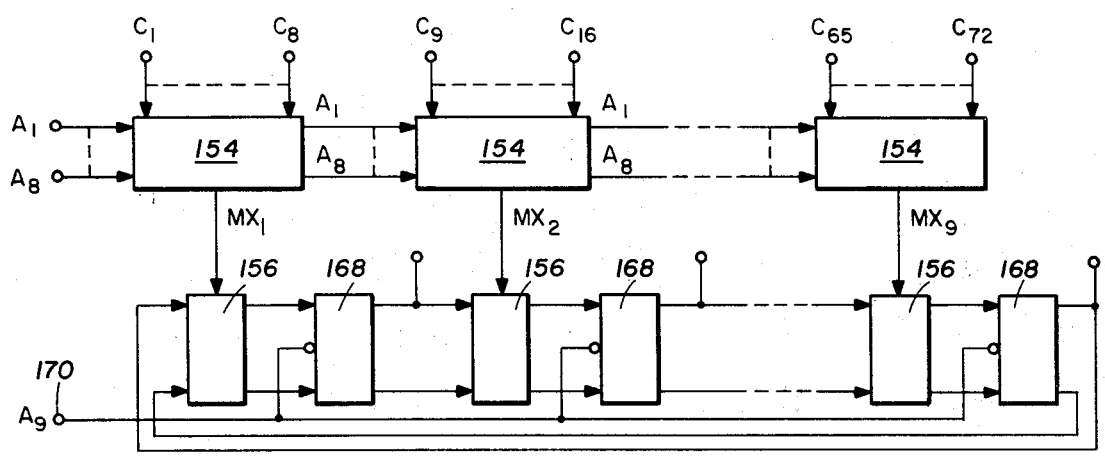
Figure 9:
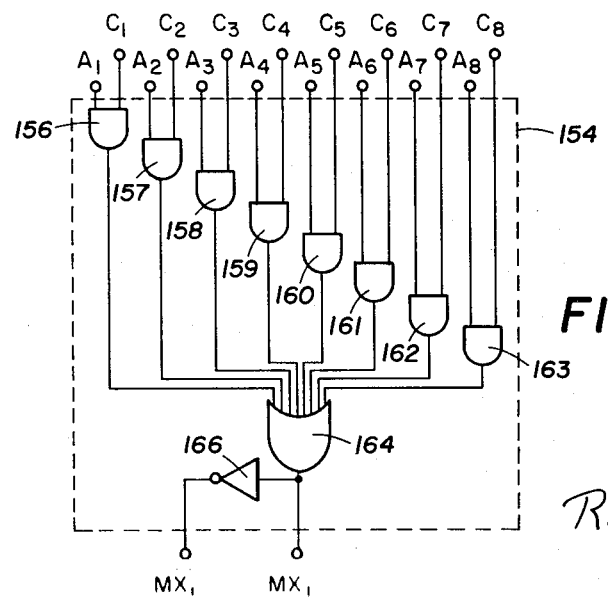

FIG. 1 is a block diagram of the system of the present invention for the sequential check-out of circuit operation;
FIG. 2 is a logic diagram of a system for checking out the operation of a circuit consisting of four NAND gates;
FIG. 3 is a schematic of a reversal logic unit used in the encoder of FIG. 2;
FIG. 4 is a block diagram of a programmer for generating up to forty input check signals and sequential control signals;
FIG. 5 is a logic diagram of a counter for the programmer of FIG. 4;
FIG. 6 is a logic diagram of a decoder for the programmer of FIG. 4;
FIG. 7 is a time diagram of the sequential control signals and the comparison initiate signal produced by the programmer of FIG. 4;
FIG. 8 is a block diagram of an encoder for sequential check-out of a circuit having up to 72 output signals; and
FIG. 9 is a logic diagram of a multiplexer for the encoder of FIG. 8.

Referring to FIG. 1, there is shown a system for sequentially checking out the operational status of a digital circuit 10 having a plurality of input signals $B_i$, and a series of output signals $C_i$. For the circuit 10, the input signals $B_i$ and the output signals $C_i$ are voltages which take one of two states, denoted the "ZERO" state and the "ONE" state, respectively. The "ZERO" state might be defined as any voltage lower than some threshold $E_1$ and the "ONE" state might be defined as any voltage higher than another threshold $E_2$, where the voltage $E_2$ is greater than or equal to the voltage $E_1$.

In addition to digital circuits, the system of the present invention will also sequentially check out the operational status of an analog circuit or an analog/digital circuit. For checking an analog circuit, the input signals $B_i$ and the output signals $C_i$ are a series of analog voltages. The values of these voltages vary over given ranges depending on the analog circuit being evaluated. For an analog/digital circuit, the input signals $B_i$ and the output signals $C_i$ will be a combination of both analog and digital signals.

During check-out of the digital circuit 10, a programmer 12 produces the input check signals $B_i$ to exercise various modes of operation of the circuit. Although a plurality of input checks signals $B_i$ are represented in FIG.

1, the check-out of some digital circuits requires only one input check signal. This one check signal initiates the digital circuit operation which, when once initiated, proceeds through various sequences that are controlled internally by the circuit itself.

In the more general case, however, a plurality of input signals $B_i$ will be required. These signals vary in a predetermined pattern in a time sequence to exercise the digital circuit 10 through various desired modes of operation. The timing sequence of the input check signals is controlled by the programmer 12 either from an internal clock or from timing signals $G_i$ supplied from the digital circuit 10. For some types of circuits, the signals $G_i$ may be necessary or convenient in generating the operational sequences of the programmer 12. An example of a $G_i$ signal might be a clock or other timing signals which originate within the circuit 10 and are convenient in deriving the programmer sequences. Whether the programmer 12 includes an internal clock or operates from timing signals from the circuit 10, the programmer provides sequential control signals $A_i$, and a comparison initiate signal E.

As the various modes of the digital circuit 10 are being exercised, it produces output signals $C_i$ which are connected to an output encoder 14. The output of the circuit 10 may include the normal outputs as well as additional check points which are selected to indicate circuit performance.

The encoder 14 responds to the output signals from the circuit 10 and encodes this set of signals at each critical time of the check-out sequence. The encoder 14 samples all the outputs at each critical time and cumulates a digital code the value of which at the completion of a check-out sequence depends upon the output signals $C_i$. If the circuit 10 has performed to the input check signals $B_i$ in accordance with designed specification, then all the outputs $C_i$ at every critical time during the test will have a predetermined order and the final digital code in the encoder 14 will have a predictable function. If one or more outputs $C_i$ of the circuit 10 does not conform to a predictable value at any critical time during the sequence, the final code in the encoder 14 will be something other than the predictable function.

To synchronize the operation of the encoder 14 with the programmer 12, sequential control signals $A_i$ are connected to the encoder. The control signals $A_i$ define the critical times at which the encoder 14 samples the output signals $C_i$.

After the programmer 12 has completed a sequence and the various modes of the circuit 10 have been exercised, the final operations code that has been generated in the encoder 14 is transferred to a comparator 16. The operations code generated by the encoder 14 may be a series of digital signals having a predetermined relationship. In the comparator 16, the operations code from the encoder 14 is compared with a "standard" code. The standard code has been derived in advance and is a function of (1) the sequence of the input check signals $B_i$ applied to the circuit 10, (2) the desired operating characteristics of the circuit and (3) the operational characteristics of the output encoder 14.

To initiate a comparison of the operations code from the encoder 14 with the standard code, the programmer 12 generates a comparison initiate signal E. At the time that the comparison initiate signal is generated, if the operations code and the standard code are similar, then the digital circuit 10 has passed the sequential check-out operations evaluation and a "GO" signal is generated by the comparator 16 on a line 18. If the two codes differ, then the circuit 10 has not performed in accordance with designed specifications and the comparator 16 will generate a "NO GO" signal on the line 18.

Referring to FIG. 2, there is shown a sequential check-out system in accordance with the present invention for evaluating the operation of a circuit consisting of NAND gates 20, 22, 23, and 24, each having three input terminals and one output terminal. It should be understood that a circuit to be operationally checked need not consist of purely combinational logic such as the NAND gates 20, 22, 23 and 24. The circuit 10 may contain both combinational and sequential logic, i.e., it may contain both logic elements and memory elements and it may require particular sequencing of the input check signals $B_i$ to properly exercise its various modes of operation.

To sequentially check-out the operation of these four NAND gates, a clock 26 produces a train of pulses 28 on a line 30. Line 30 applies the clock pulses 28 to a four-stage binary counter 32 which has four pairs of complementary digital output signals, $(A,\overline{A})$ $(B,\overline{B})$ $(C,\overline{C})$ and $(D,\overline{D})$. The clock 26 and the counter 32 comprise the programmer 12 of FIG. 1.

Four stage binary counters are conventional devices containing four flip-op circuits; when properly interconnected the four flip-flop circuits divide the output of the clock 26 by sixteen. The four pairs of complementary outputs of the counter 32 are sequenced through predetermined patterns at each clock pulse 28. The first three pairs of outputs are connected to inputs of the NAND gates 20, 22, 23 and 24. Thus, as the complementary output pairs of the counter 32 vary in response to the clock pulses 28, the inputs to the NAND gates change in a preordered pattern.

Considering the two level logic signals defined earlier, the NAND gate 20 generates a logic ZERO level signal on line 34 only when the three inputs A, B, and C, are at a logic ONE level. For the NAND gate 22, it will produce a logic ZERO level signal on a line 36 only when the inputs A and B are at a logic ONE level and the input $\overline{C}$ is at a logic ONE level. NAND gate 23 produces a logic ZERO level signal on a line 38 only when the inputs A and C are at a logic ONE level and the input $\overline{B}$ is at a logic ONE level. The NAND gate 24 produces a logic ZERO level signal on a line 40 only when the input $\overline{A}$ is at a logic ONE level and the inputs B and C are at a logic ONE level. Since the complementary pair outputs of the counter 32 vary between a logic ONE and a logic ZERO level in a preordered pattern, the NAND gates 20, 22, 23 and 24 will generate output signals at a logic ZERO level only at certain times in the sequence produced by the binary counter.

As the binary counter is stepped through the various sequences by the clock pulses 28, the digital code on the lines 34, 36, 38 and 40 assumes a preordered relationship at each critical time. This logic code is connected to an end-around shift register encoder (corresponding to the output encoder 14 of FIG. 1) that includes a series arrangement of flip-flop circuits 42, 44, 46 and 48. Between the flip-flop circuits 42 and 44 there is connected a reverse logic unit 50 which has a control terminal tide to the line 34. Between the flip-flop circuits 44 and 46, there is connected a reverse logic unit 52 having a control terminal tied to the line 36. Similarly, a reverse logic unit 54 having a control terminal tied to the line 38 is connected between the flip-flop circuits 46 and 48. Following the flip-flop circuit 48, there is connected a reverse logic unit 56 having a control terminal tied to the line 40. The output of logic unit 56 is connected to the input of flip-flop circuit 42.

Each of the flip-flops is a conventional circuit having two stable states. A flip-flop changes from one stable state to the other by means of the clock pulse connected to a trigger input terminal. Using flip-flop 42 as an example, when the output $F_0$ is at the logic ONE level, then the output $\overline{F}_0$ will be the complement of the $F_0$ output, that, $\overline{F}_0$ will be at a logic ZERO level. if the SET and RESET inputs to flip-flop 42 are in the logic ZERO and ONE states, respectively, then upon the occurrence of a clock pulse 28 on the line 30, the flip-flop 42 changes states and the $F_0$ output will be at the logic ZERO level and the $\overline{F}_0$ output will be at a logic ONE level.

The two complementary voltages of the flip-flop 42 are coupled to inputs of the reverse logic unit 50. The reverse logic unit will either pass the outputs of the flip-flop 42 directly to the flip-flop 44 or change the outputs of the flip-flop 42 to the complements before being applied to the flip-flop 44. Whether or not the reverse logic unit 50 affects the signals transfered between the flip-flops 42 and 44 depends on the condition of the signal on line 34. If the signal on line 34 is at a logic ZERO level when a clock pulse occurs, then the logic level of the flip-flop 42 will be transfered directly and unchanged to the flip-flop 44. Accordingly, if $F_0$ is at a logic ONE level when a clock pulse occurs, then $F_1$ will be at the logic ONE level. If the output of the NAND gate 20 is at a logic ONE level when a clock pulse occurs, then the reverse logic unit 50 will cause the logic state of the flip-flop 44 to become the complement of the logic state of flip-flop 42 just prior to the clock pulse. In this case, the input to the flip-flop 44 will be the logic complement of the output of the flip-flop 42. Reverse logic units 52, 54, and 56 operate in the identical manner as the logic unit 50. They function to transfer the complement of a flip-flop state to the following flip-flop stage whenever a signal at the control terminal is at the logic ONE level.

Referring to FIG. 3, there is shown a logic diagram for a reverse logic unit. As illustrated, the unit includes AND gates 58, 60, 62 and 64 and OR gates 66 and 68. Assume that the circuit of FIG. 3 represents othe reverse logic unit 50, terminals 70 and 72 are connected to the flip-flop 42 at the terminals $F_0$ and $\overline{F}_0$, respectively. Terminal 74 connects directly to the output of the NAND gate 20 and terminal 76 connects to the output of the NAND gate 20 through an inverting amplifier (not shown). Thus, the signals on terminals 74 and 76 are complementary, with the signal on terminal 74 at the logic level of the NAND gate 20 and the signal at the terminal 76 the complement thereof. Internally, terminal 70 connects to the AND gates 60 and 62 and to an output line 78. Note, the signal on line 78 will be the signal at the terminal 70. Terminal 72 connects to the AND gates 58 and 64 and to an output line 80. Line 80 thus has the same signal as terminal 72. Lines 78 and 80 contain one information bit of the operations code that will be compared with a "standard" code. Internally, the terminal 74 connects to the AND gates 58 and 62; the terminal 76 connects to the AND gates 60 and 64. The output of the AND gates 58 and 60 are inputs to the OR gate 66 and outputs of the AND gates 62 and 64 are inputs to the OR gate 68.

If the output of the NAND gate 20 is at the logic ZERO level, then the logic level at terminal 70 will be transferred to the output of the OR gate 66 at a terminal 82 and the logic level at the terminal 72 will be transferred to the output of the OR gate 68 at a terminal 84. When the output of NAND gate 20 switches to the logic ONE level, the output at the terminal 82 will be the reverse of the level at the terminal 70, and the output a the terminal 84 will be the reverse of the signal at the terminal 72.

Returning to FIG. 2, upon the occurence of each clock pulse 28 on the line 30, the end-around shift register comprising the flip-flops and reverse logic units changes states. The state of any one flip-flop will be determined by the state of the preceding flip-flop plus the affect of the intermediate reverse logic unit. Various stages of the shift register can be considered to contain one bit of a code which is varied in accordance with the operation of the NAND gates 20, 22, 23 and 24 in response to the condition of the counter 32. Throughout the test, the effect of the outputs of the NAND gates on the content of the shift register will be cumulative so that at the completion of a test, the shift register should contain a particular pattern of logic bits determined by the sequence of the circuit during the entire test. If the output of a NAND gate is at a logic ONE level when a clock pulse occurs, the logic level of the associated following shift register stage will be the reverse of the preceding stage. When any one of outputs of the NAND gates changes to a logic ZERO level, the following flip-flop will have the same logic level as the preceding flip-flop after the occurrence of a clock pulse.

As an example, assume a logic ZERO level on the lines 34 and 36 and the logic level of the flip-flop 44 is opposite to the logic level of the flip-flop 42. If the logic level on line 34 changes to the logic ONE level before the next clock pulse occurs, the state of the flip-flop 44 will be transferred to the flip-flop 46 and the state of the flip-flop 42 will be reversed before transfer to the flip-flop 44. Since the flip-flops 42 and 44 had opposite logic levels, now the flip-flops 44 and 46 will have identical logic states. Next assume that all outputs of the NAND gates are at a logic ONE level; upon the occurrence of the next clock pulse on line 30, the flip-flops 46 and 48 will now have the identical logic states since flip-flops 46 and 48 are both changed to the complements of flip-flops 44 and 46 which had identical states prior to the clock pulse.

Referring to the table, in the first four columns there is listed the outputs of the counter 32 for a complete testing sequence of the NAND gates 20, 22, 23 and 24. Each line indicates the occurrence of a clock pulse 28, that is, one critical time in the testing of the NAND gate circuits. The middle four columns of the table give the logic state of the outputs of the NAND gates 20, 22, 23 and 24. These logic levels are determined by the outputs of the counter 32. The last four columns of the table indicate the state of the flip-flops 42, 44, 46 and 48.

TABLE

| Binary counter state | | | | | | | | Shift register state | | | |
|---|---|---|---|---|---|---|---|---|---|---|---|
| A | B | C | D | G1 | G2 | G3 | G4 | $F_0$ | $F_1$ | $F_2$ | $F_3$ |
| 0 | 0 | 0 | 0 | 1 | 1 | 1 | 1 | 0 | 0 | 0 | 0 |
| 1 | 0 | 0 | 0 | 1 | 1 | 1 | 1 | 1 | 1 | 1 | 1 |
| 0 | 1 | 0 | 0 | 1 | 1 | 1 | 1 | 0 | 0 | 0 | 0 |
| 1 | 1 | 0 | 0 | 1 | 0 | 1 | 1 | 1 | 1 | 1 | 1 |
| 0 | 0 | 1 | 0 | 1 | 1 | 1 | 1 | 0 | 0 | 1 | 0 |
| 1 | 0 | 1 | 0 | 1 | 1 | 1 | 1 | 1 | 1 | 1 | 0 |
| 0 | 1 | 1 | 0 | 1 | 1 | 0 | 1 | 1 | 0 | 0 | 1 |
| 1 | 1 | 1 | 0 | 0 | 1 | 1 | 1 | 1 | 0 | 1 | 1 |
| 0 | 0 | 0 | 1 | 1 | 1 | 1 | 1 | 0 | 1 | 1 | 0 |

To start the testing sequence, assume that the counter 32 and the four stages of the end-around shift register have been reset to the logic ZERO state; the outputs of the counter 32, the NAND gates and the flip-flops will be as given in line 1 of the table. Upon the occurrence of the first clock pulse 28, the first output of the counter 32 will change to the logic ONE level and each of the shift register flip-flops will switch to a logic ONE state. This is indicated by the second line of the table. Upon the occurrence of a second clock pulse 28, a logic ONE level signal appears at the second output of the counter 32 and the flip-flops again change to the logic ZERO level because all the outputs of the NAND gates are at logic ONE. This is indicated by line 3 of the table. Upon the occurrence of the fourth clock pulse 28, the first two outputs of the counter 32 are at the logic ONE level and the third output at a logic ZERO level. This combination of logic "1's" and "0's" satisfies the conditions for the NAND gate 22 and its output changes from logic ONE to logic ZERO. At this time, the flip-flops again change to the logic ONE level. Note, that at the occurrence of the third clock pulse, even though the output of the NAND gate 22 was at the logic ZERO level, the pattern of the flip-flop outputs was not affected. Upon the occurrence of the fourth clock pulse 28, the output of the NAND gate 22 again returns to the logic ONE level. At this fourth clock pulse, the output of the flip-flop 46 now remains at the logic ONE level (since it assumes the state held by F, prior to the clock pulse) while the others reverse to the logic ZERO level. This is indicated at line 5 of the table. At the next clock pulse, the output of the NAND gate 23 changes to the logic ZERO level and the output of the flip-flop 48 remains at the logic ZERO level. Thus, on the fourth pulse the flip-flop 46 remained at its previous logic level and upon the occurrence of the fifth pulse the flip-flop 48 remained at its logic level. The effects of the logic ZERO output from the NAND gate 22 has thus been transferred through the end-around shift register.

Subsequent clock pulses produce other combinations of outputs of the NAND gates at the logic ZERO level, thus affecting the states of the flip-flops. After eight clock pulses, the NAND gates 20, 22, 23 and 24 have been sequenced through the desired operating modes and the end-around shift register contains an operating code indicating whether they have performed correctly or incorrectly.

When the eighth clock pulse 28 appears on the line 30, the first three outputs of the counter 32 change to a logic ZERO level and the fourth output changes to a logic ONE level. The fourth output of the counter 32 is the comparison initiate signal which causes a comparison to be made between the operations code and a standard code. The operations code is contained in the end-around shift register at the output of the flip-flops 42, 44, 46 and 48. This code is given on line 9 of the table.

To compare this code with a standard code, one output of each flip-flop is connected to an AND gate 86. Flip-flop 42 will be connected to the AND gate 86 by means of the line 80. The line 78 in this case will not be required. In the example under discussion, the standard code is implemented by selecting certain outputs of the flip-flops to be connected to the AND gate 86. The first input to the AND gate 86 is $\overline{F_0}$, the second input $F_1$, the third input $F_2$, and the fourth input $\overline{F_3}$. Whenever all four of these inputs are at a logic ONE level, the output of the AND gate 86 will be at the logic ONE level. This applies a logic ONE signal to an AND gate 89 and a logic ZERO level signal to an AND gate 90 through an inverting amplifier 92.

Upon the occurrence of the eighth clock pulse 28, the fourth output of the counter 32 changes to the logic ONE level which connects to the AND gates 89 and 90. If the output of the AND gate 86 is at the logic ONE level after the occurrence of this eighth clock pulse, then the output of the AND gate 89 will go to a logic ONE level. This indicates that the circuits have operated correctly giving a "GO" signal. On the other hand, if when the fourth output of the counter 32 goes to the logic ONE level, the output of the AND gate 86 is logic ZERO, then both inputs to the AND gate 90 will be logic ONE thereby producing a logic ONE output. This indicates that the circuits have not operated correctly, giving a "NO GO" signal. Thus, after the occurrence of the eighth clock pulse 28, a "GO" or "NO GO" signal will be generated indicating correct or incorrect operation of the NAND gates 20, 22, 23 and 24. After occurrence of the eighth clock pulse, the "GO" or "NO GO" signal is provided and the test is complete. To provide a continuous indication of the "GO" or "NO GO" status, further clock pulses 28 on line 30 may be inhibited through the provision of appropriate logic. To re-initiate the test, the four-stage counter 32 and the shift register must be returned to the all ZERO states.

Referring to FIG. 4, there is shown a block diagram of a programmer for a circuit generating up to 40 input check signals. A clock 94 provides pulses to a counter 96 at a predetermined rate, for example, 1280 pulses per second. Counter 96 is a four-stage, divide-by-eight Johnson (or shift) counter that recycles every eight clock pulses. It has eight states which are decoded by a decoder 98 to provide eight sequential control signals $A_1, A_2 \ldots A_8$ to the encoder 14 of FIG. 1.

Referring to FIG. 5, there is shown a logic diagram of the counter 96 that includes four interconnect flip-flop stages 100, 102, 104 and 106. Clock pulses from the clock 94 are applied to the flip-flop stages at a terminal 108 and the eight logic signals appear at terminals 110 through 117. With the flip-flop stages in the state shown, terminals 110, 113, 115, and 117 are at the logic ZERO level and terminals 111, 112, 114, and 116 are at the logic ONE level. The output 146 and 117 of flip-flop 106 are connected to the RESET and SET inputs, respectively, of the flip-flop 100. Shift pulses for activating the flip-flops are applied at terminal 108 and counter CLEAR and PRESET inputs may be applied to terminals 128 and 126, respectively.

As mentioned, the counter of FIG. 5 is connected as a Johnson counter. Each clock pulse at the terminal 108 advances the counter one state. After eight clock pulses, at the terminal 108, the counter recycles. The eight states of the counter are evidenced by patterns of logic ONE and logic ZERO level signals at the terminals 110 through 117. As explained, these eight states are decoded into sequential clock control signals by a decoder 98.

Referring to FIG. 6, there is shown a logic diagram of a system for decoding the eight logic states at terminals 110 through 117. These eight terminals are interconnected in a predetermined pattern to one or more NAND gates 130 through 137. The output of each NAND gate 130 through 137 is inverted in an amplifier 138 through 145, respectively. Using known logic and gate operation, it can be shown that the NAND gates 130 through 137 and the inverters 138 through 145 decode the eight states of the counter 96 into eight sequential control signals at $A_1$ through $A_8$.

Referring to FIG. 7, there is shown on the top line a train of clock pulses having a period of $\frac{1}{1280}$ second. These clock pulses are counted and decoded into the sequential control signals. Control signal $A_1$ is illustrated at line 2 and has a pulse width of $\frac{1}{1280}$ second. By interconnecting the NAND gates 130 through 137 as shown in FIG. 6, the sequential control signal $A_2$ appears at the trailing edge of the control signal $A_1$. The control signal $A_2$, like all the sequential control signals is $\frac{1}{1280}$ second in duration. At the trailing edge of the control signal $A_2$, the control signal $A_3$ will appear at the output of the inverting amplifier 140. After eight clock pulses, the control signal $A_8$ will appear at the trailing edge of the control signal $A_7$. Control signal $A_8$ is illustrated at line 4 of FIG. 7 and terminates at the leading edge of the next sequential control signal $A_1$. Note, that the time between trailing edges of subsequent control signals $A_8$ is $\frac{1}{160}$ second.

The output at the last stage of the counter 96 at terminal 146 of FIG. 5 is a 160 pulse per second signal which is applied to a counter 148. The counter 148 has three stages and is a divide by eight binary counter that recycles every eight input pulses. It has eight states that are decoded by a decoder 150. Only the last $\frac{1}{160}$ second of every eight count cycle of the counter 148 is decoded in the decoder 150 when using a 1280 pulse per second counter. This decoded signal, identified as $T_8$, gates the output of the clock 94. The clock pulses gated by a decode signal $T_8$ are denoted $A_9$ and are applied to the output encoder 14. The gated clock pulses occur in burst of eight with $\frac{1}{1280}$ second separating the leading edge of successive pulses in the burst. Using a 1280 pulse per second clock, the burst of eight pulses repeats every 50 milliseconds.

The output of the last stage of the counter 148 is a 20 pulse per second signal which is applied to an input sequence control 152. An input sequence controller contains logic circuitry that is tailored to the digital circuit under evaluation. In FIG. 2, the input sequence control comprises the four-stage binary counter 32.

The control 152 of FIG. 4 produces 40 input check signals for advancing a digital circuit through various operating modes. It applies sequences of logic ONE's and logic ZERO's to the 40 lines $B_1$ through $B_{40}$ which are connected to the inputs of the digital circuit under evaluation. Both sequential and combinational logic, in addition to pulse counters, are contained within the sequence control 152. The combinational logic decodes the outputs of the counters and provides sequences of logic ONE's and logic ZERO's to the lines $B_1$ through $B_{40}$. The sequence of ONE's and ZERO's applied to the 40 lines are such as to exercise the various modes of a digital circuit being checked out.

A sequence of ONE's and ZERO's applied to a particular line is not necessarily the same sequence as that applied to some other line, and, in general, the sequences will be different. In the example, using a 1280 pulse per second counter, the generation of the sequences, the change from logic ONE to logic ZERO, or vice versa, occurs at a maximum rate of 20 changes per second. All changes of any of the 40 signals occur simultaneously, and are synchronized with the trailing edge of the pulse signal from the counter 148 applied to the input of the sequence control 152.

After sequencing the digital circuit such that the desired modes have been exercised, the input sequence control 152 generates a voltage on line E as a comparison initiated signal connected to the comparator 16.

As the various modes of a digital system are exercised by the programmer of FIG. 4, the digital circuit provides outputs to an encoder such as illustrated by a logic diagram in FIG. 8. The encoder of FIG. 8 is capable of decoding 72 outputs from a digital system which are applied as inputs to nine multiplexer stages 154. Each multiplexer 154 is capable of multiplexing a group of input signals to one stage of reversal logic in an end-around shift register of the type described in FIG. 2. Control signals for operating the multiplexers 154 are the sequential control signals $A_1$ through $A_8$. These signals sequentially apply the 72 outputs from the digital circuit under test to respective reverse logic units 156.

Referring to FIG. 9, there is shown a logic diagram of a multiplexer 154 consisting of AND gates 156 through 163. Outputs from the AND gates 156 through 163 are interconnected to the inputs of an OR gate 164. Inputs to each of the AND gates 156 through 163 consist of one output signal from the digital circuit under evaluation and one of the sequential control signals $A_1$ through $A_8$. The output of the multiplexer 154 appears at the output of the OR gate 164 and at the output of an inverting amplifier 166 connected to the OR gate output. Thus, the multiplexer 154 has a complementary pair of output signals. These complementary signals are connected to one reverse logic unit 156.

As explained, the sequential control signals $A_1$ through $A_8$ are in a repeating sequence during the evaluation of a circuit. Only one of the control signals $A_1$ through $A_8$ is high at a particular time; the signal which is high transfers the corresponding AND gate input to the OR gate 164. For example, when the control signal $A_1$ is high, the logic signal $C_1$ is gated through the AND gate 156 to the output of the OR gate 164. Expanding this to all nine multiplexers 154 of the encoder of FIG. 8, the control signal $A_1$ gates the circuit outputs $C_9$ and every eighth output until $C_{65}$ to respective reverse logic units 156. When the control signal $A_2$ is high, the circuit output $C_2$ is gated to the output of the OR gate 164 through the AND gate 157. The control signal $A_2$ also gates the output signal $C_{10}$ and every eighth output signal until $C_{66}$ to the output of the respective multiplexer 154.

The output signal of the multiplexers 154 ($MX_1$ through $MX_9$) are applied respectively to the reverse logic units 156. Connected between each logic unit 156 is a flip-flop circuit 168 in a manner similar to that described in FIG. 2. When a shift pulse $A_9$ occurs at terminal 170, the state of each flip-flop 168 in the shift register is transferred to the next stage in either true or complemented form.

If the output of the multiplexer $MX_1$ is at a logic ZERO level when a shift pulse occurs, the state of the flip-flop circuit $F_{i-1}$ is transferred directly to the flip-flop $F_i$. If $MX_1$ is at a logic ONE level when the shift pulse occurs, the state of the flip-flop $F_{i-1}$ is transferred to the flip-flop $F_i$ in complemented form. Thus, the reverse logic units 156 set the succeeding flip-flop opposite to that of the preceding flip-flop when the input to the reverse logic unit is at the logic ONE level when the shift pulse occurs.

Before starting the test of a circuit, all flip-flops of the shift register are reset to the logic ZERO state. Throughout the circuit tests, the effect of the multiplexer outputs on the content of the shift register is cumulative so that at the completion of a test cycle, the shift register contains a particular pattern of logic ONE's and logic ZERO's determined by the sequence of circuit operation. As explained, in FIG. 2 the final pattern of ONE's and ZERO's in the shift register is compared in the comparator 16 when the input sequence control 152 generates the comparison initiate signal on line E.

It should be understood that the output encoder described in FIGS. 2 and 8 are only examples of many possible arrangements that will relate the digital circuit output to a specific final result in the form of an operations code. For example, in another arrangement if a multiplexer output $MX_1$ is logic ZERO, the state of the flip-flop circuit $F_{i-1}$ is transferred to a flip-flop $F_i$ unchanged when a shift pulse occurs. If the multiplexer output $MX_1$ is at a logic ONE level, the complement of the flip-flop circuit $F_{i-2}$ is transferred to the flip-flop $F_i$. Other arrangements of the output encoder exist which relate the digital system output sequence to a specific final result in the shift register.

To analyze an analog circuit, the output encoder also includes one or more analog-to-digital converters to convert the analog voltages from the circuit under evaluation to digital representations. One method of analog-to-digital conversion involves simple threshold detection wherein the digital representation of an analog voltage is a logic ONE or a logic ZERO depending on whether the analog voltage is below or above a threshold voltage. Another means of conversion involves generation of a digital signal whose value depends on whether the analog voltage is within or outside lower and upper voltage limits. Since the analog system requires analog input signals, the programmer 12 is designed to apply varying analog input check signals to the circuit 10, instead of the digital sequence described.

While preferred embodiments of the invention have been described in detail herein, and shown in the accompanying drawings, it will be evident that various further modifications are possible.

What is claimed is:

1. A sequential check-out system for operation evaluation of a circuit responsive to input signals and having a plurality of output signals, comprising:
   programming means for generating input check signals to the circuit under evaluation to continuously exercise said sequence,
   an end-around shift register responsive to the plurality of output signals of the circuit under evaluation in response to the input check signals at selected times when exercised through the various operating modes for encoding the plurality of output signals from the circuit operation into an operations code,
   means for synchronizing the operation of said end-around shift register with said programming means to define the selected times for said shift register to be responsive to the plurality of output signals to encode the circuit operation into a single operations code, and
   means for comparing the encoded operations code with a standard operations code and generating a circuit acceptance indication when the two codes are similar and a circuit rejection indication when the two codes differ.

2. A sequential check-out system for circuit operation evaluation as set forth in claim 1 including means for generating a comparison initiate signal after said circuit has been exercised through the various operation modes to activate said comparing means.

3. A sequential check-out system for circuit operation evaluation as set forth in claim 1 wherein said programming means includes a pulse generator for producing clock pulses to advance the exercise of said circuit through the various operating modes.

4. A sequential check-out system for circuit operation evaluation as set forth in claim 1 wherein said shift register includes alternate stages of flip-flop circuits and reverse logic units.

5. A sequential check-out system for operation evaluation of a circuit responsive to input signals and having a plurality of output signals, comprising:
   pulse generating means for producing a train of clock pulses to provide sequential control signals,
   programming means responsive to at least one of said sequential control signals for generating a sequence of input check signals to the circuit under evaluation to continuously exercise said circuit through various operating modes in an uninterrupted timed sequence,
   an end-around shift register responsive to the plurality of output signals of the circuit under evaluation in response to the input check signals at selected times when exercised through the various operating modes for cumulatively encoding the circuit operation into a single operations code, said end-around shift register sequenced to advance the operations code in response to at least one of the sequential control signals,
   means for synchronizing the operation of said end-around shift register with said programming means to define the selected times for said register to be responsive to the plurality of output signals to encode the circuit operation into a single operations code, and
   means for comparing the operations code with a standard code and generating a circuit acceptance indication when the two codes are similar and a circuit rejection indication when the two codes differ.

6. A sequential check-out system for circuit operation evaluation as set forth in claim 5 wherein said programming means includes means for generating a comparison initiate signal after said circuit has been exercised through the various operational modes to activate said comparing means.

7. A sequential check-out system for circuit operation evaluation as set forth in claim 6 wherein said shift register includes alternate stages of flip-flop circuits and reverse logic units, said flip-flop circuits triggered by at least one of the sequential control signals and said reverse logic units responsive to the output of the circuit under evaluation.

8. A sequential check-out system for circuit operation evaluation as set forth in claim 7 including means for multiplexing a plurality of the output signals from the circuit under evaluation to one stage of reverse logic.

9. A sequential check-out system for circuit operation evaluation as set forth in claim 8 wherein said comparing means includes AND gate logic with one output of each flip-flop circuit connected to an AND gate.

10. A sequential check-out system for circuit operation evaluation as set forth in claim 9 wherein said comparing means further includes one AND gate responsive to the comparison initiate signal for generating a circuit acceptance indication output and a second AND gate also responsive to the comparison initiate signal for producing the circuit reject indication output.

11. A method of sequential check-out of the operation of a circuit responsive to input signals and having a plurality of output signals, comprising:
   generating a sequence of input signals to be connected to inputs of the circuit under evaluation to continuously exercise said circuit through various operating modes in an uninterrupted timed sequence,
   shifting the plurality of output signals of the circuit under evaluation in response to the input check signals at selected times when exercise through the various operating modes through a shift register for encoding into a digital operating code,
   synchronizing the operation of said shifting with said generating of the input signals to define the selected times for encoding the circuit operation into a digital operating code, and
   comparing the operations code with a standard code and generating a circuit acceptance indication when the two codes are similar and a circuit rejection indication when the two codes differ.

12. A metheod of sequential check-out of circuit operation as set forth in claim 11 including the step of generating a comparison initiate signal to initiate a comparing of the operating code with the standard code.

13. A method of sequential check-out of circuit operation as set forth in claim 12 wherein shifting the output signals includes shifting the output signals through alternate stages of flip-flop circuits and reverse logic, said reverse logic units responsive to the output signals of the circuit under evaluation.

14. A method of sequential check-out of circuit operation as set forth in claim 13 including the step of multiplexing a plurality of output signals from the circuit under evaluation to one reverse logic unit.

References Cited

UNITED STATES PATENTS

| 3,182,253 | 5/1965 | Dorsch et al. | 324—66 X |
| 3,032,191 | 5/1962 | Clukey | 324—73 UX |
| 3,286,175 | 11/1966 | Gerbier et al. | 324—73 |
| 3,311,890 | 3/1967 | Waaben | 324—73 UX |
| 3,528,006 | 9/1970 | Davis et al. | 324—73 |

OTHER REFERENCES

Cargile, William P.; A Computer-Controlled System for Testing Digital Logic Modules; Hewlett Packard Journal March 1969, pp. 14–19.

GERARD R. STRECKER, Primary Examiner

U.S. Cl. X.R.

324—51